(12) United States Patent
Imai

(10) Patent No.: US 9,981,558 B2
(45) Date of Patent: May 29, 2018

(54) ELECTRIC VEHICLE

(71) Applicant: Toyota Jidosha Kabushiki Kaisha, Toyota-shi Aichi-ken (JP)

(72) Inventor: Yasuhito Imai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 165 days.

(21) Appl. No.: 15/238,028

(22) Filed: Aug. 16, 2016

(65) Prior Publication Data

US 2017/0050524 A1 Feb. 23, 2017

(30) Foreign Application Priority Data

Aug. 20, 2015 (JP) ................................ 2015-162940

(51) Int. Cl.
  *G06F 19/00* (2018.01)
  *B60L 3/00* (2006.01)
  (Continued)

(52) U.S. Cl.
  CPC .............. *B60L 3/0084* (2013.01); *B60K 6/26* (2013.01); *B60K 6/28* (2013.01); *B60L 3/003* (2013.01); *B60L 3/0046* (2013.01); *B60L 11/1803* (2013.01); *B60Y 2200/92* (2013.01); *B60Y 2300/097* (2013.01); *B60Y 2306/15* (2013.01); *B60Y 2400/11* (2013.01);
  (Continued)

(58) Field of Classification Search
  CPC ...... B60L 3/0084; B60L 3/003; B60L 3/0046; B60L 11/1803; B60K 6/26; B60K 6/28; B60Y 2200/92; B60Y 2300/097; B60Y 2306/15; B60Y 2400/11; B60Y 2400/604; B60Y 2400/61; Y02T 10/7005; Y10S 903/906
  USPC ........................................................ 701/1, 22
  See application file for complete search history.

(56) References Cited

U.S. PATENT DOCUMENTS 9,014,893 B2 * 4/2015 Yamamoto ................ B60L 7/14
                                                                  180/65.265
2006/0100057 A1 * 5/2006 Severinsky ............ B60H 1/004
                                                                  477/4

(Continued)

FOREIGN PATENT DOCUMENTS

JP 2014-124045 A 7/2014
JP 2014-125127 A 7/2014

*Primary Examiner* — Ronnie Mancho
(74) *Attorney, Agent, or Firm* — Dinsmore & Shohl LLP

(57) ABSTRACT

An electric vehicle includes a motor control unit. The motor control unit is configured to repeatedly execute a communication disruption determination for determining whether communication with a main control unit is disrupted; output a communication disruption signal when the motor control unit determines that the communication is disrupted; change a determination procedure of the communication disruption determination such that the communication disruption determination is completed in a shorter time when a crash possibility signal is received prior to the communication disruption determination, than when the crash possibility signal is not received prior to the communication disruption determination; and control a discharge circuit to discharge the electric charge of the smoothing capacitor, when the crash possibility signal is received prior to the communication disruption determination and the communication disruption signal is output.

4 Claims, 2 Drawing Sheets

(51) Int. Cl.
*B60K 6/28* (2007.10)
*B60L 11/18* (2006.01)
*B60K 6/26* (2007.10)

(52) U.S. Cl.
CPC ..... *B60Y 2400/604* (2013.01); *B60Y 2400/61* (2013.01); *Y02T 10/7005* (2013.01); *Y02T 90/16* (2013.01); *Y10S 903/906* (2013.01); *Y10S 903/907* (2013.01); *Y10S 903/93* (2013.01)

(56) References Cited

U.S. PATENT DOCUMENTS

| | | | | |
|---|---|---|---|---|
| 2010/0025127 | A1* | 2/2010 | Oyobe | B60K 6/26 180/65.22 |
| 2013/0096764 | A1* | 4/2013 | Yamamoto | B60K 6/445 701/22 |
| 2013/0190958 | A1* | 7/2013 | Izumi | B60W 20/20 701/22 |
| 2014/0114523 | A1* | 4/2014 | Hirasawa | B60K 6/445 701/22 |
| 2015/0210179 | A1* | 7/2015 | Teraya | B60K 6/445 307/10.1 |
| 2015/0314685 | A1* | 11/2015 | Imamura | B60L 3/0046 318/504 |
| 2015/0343904 | A1 | 12/2015 | Ikeyama et al. | |
| 2016/0082849 | A1* | 3/2016 | Yamasaki | B60L 1/00 290/3 |
| 2016/0138245 | A1* | 5/2016 | Moki | H02M 3/33584 290/50 |
| 2016/0252069 | A1* | 9/2016 | Teraya | B60W 20/00 701/22 |
| 2016/0339905 | A1* | 11/2016 | Inoue | B60K 6/445 |

* cited by examiner

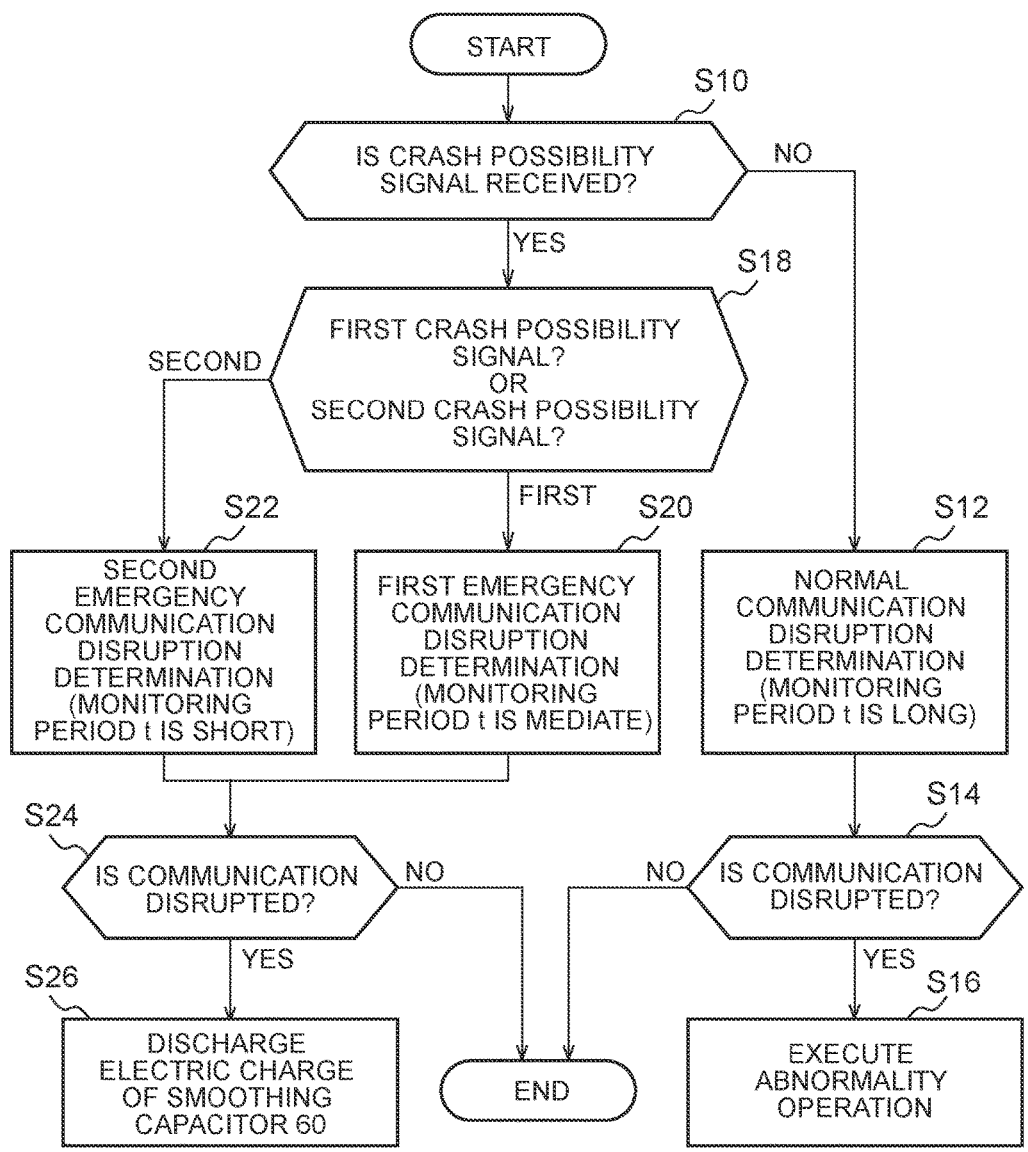

ELECTRIC VEHICLE

CROSS-REFERENCE TO RELATED APPLICATIONS

This application claims priority to Japanese Patent Application No. 2015-162940 filed on Aug. 20, 2015, the entire contents of which are hereby incorporated by reference.

BACKGROUND

1. Technical Field

A technique disclosed in this specification relates to an electric vehicle. The electric vehicle referred in this specification means a vehicle that includes a motor for traveling (traveling motor) for rotating drive wheels. The electric vehicle includes: a vehicle that includes an engine in addition to the traveling motor (a so-called hybrid vehicle); a vehicle that supplies electric power from a battery to the traveling motor; and a vehicle that supplies the electric power from a fuel cell to the traveling motor (a so-called fuel cell vehicle).

2. Description of Related Art

In Japanese Patent Application Publication No. 2014-124045 (JP 2014-124045 A), a hybrid vehicle in which drive wheels are rotated by an engine and a traveling motor is disclosed. A circuit for driving the traveling motor has: a boosting converter that increases a direct current voltage of a battery; an inverter that converts an output voltage of the boosting converter to an alternative current voltage and supplies the alternative current voltage to the traveling motor; and a motor control unit (an MG-ECU) that controls the boosting converter and the inverter. A smoothing capacitor for suppressing pulsations of a voltage is connected between input terminals of the inverter (that is, between output terminals of the boosting converter). In a normal state, a high voltage is applied to the smoothing capacitor. Thus, at a time of abnormality, electric charge needs to be discharged from the smoothing capacitor to secure safety. For this reason, this hybrid vehicle has a discharge circuit for discharging the electric charge of the smoothing capacitor, and the motor control unit controls the discharge circuit. This hybrid vehicle also has: a main control unit (an HV-ECU) for controlling output distribution of the engine and the traveling motor; and a crash possibility determination unit (a PCS-ECU) for determining a possibility of a crash of the vehicle.

In electric vehicles including the above-described hybrid vehicle, in order to secure the safety, it is demanded to promptly discharge electric charge of the smoothing capacitor during a crash. In the hybrid vehicle of JP 2014-124045 A, the discharge circuit discharges the electric charge of the smoothing capacitor during the crash. Note that, because a large current flows through the discharge circuit during an operation of the discharge circuit, a significantly large load is applied to components that constitute the discharge circuit. Thus, the discharge circuit cannot be operated frequently. Therefore, it becomes necessary to accurately detect the crash of the vehicle and to operate the discharge circuit only when necessary.

In the hybrid vehicle of JP 2014-124045 A, a crash possibility determination and a communication disruption determination are combined to detect the crash of the vehicle.

The crash possibility determination is made by the crash possibility determination unit. The crash possibility determination unit is connected to a sensor group that is mounted in the vehicle. The sensor group is constructed with plural sensors that measure a travel state of the vehicle (a situation around the vehicle, a vehicle speed, a vehicle route, and the like). For example, the sensor group possibly contains: a millimeter wave radar and/or a camera that detects obstacles and other vehicles around the vehicle; an acceleration sensor that detects acceleration added to the vehicle; a vehicle speed sensor that detects a travel speed of the vehicle; an angular sensor that detects a steering angle of a steering wheel; and the like. Prior to the crash, the crash possibility determination unit determines whether there is a possibility of the crash of the vehicle based on data output by the sensor group. If there is the possibility of the crash of the vehicle, the crash possibility determination unit transmits a signal indicative of such a fact to the motor control unit. Even if it is determined that there is the possibility of the crash, the crash may be avoided by means of emergency avoidance or the like. Thus, it is not adequate to determine, only by the crash possibility determination, that the crash has occurred.

The communication disruption determination is made by the motor control unit. The main control unit is configured to periodically transmit a signal (for example, a signal for controlling the traveling motor, and the like) to the motor control unit. On the basis of the periodical signal transmitted by the main control unit, the motor control unit repeatedly determines whether communication with the main control unit is disrupted. There is a case where the communication is disrupted due to failure of the main control unit, a communication wire, or the like. There is also a case where the communication is disrupted due to the crash of the vehicle. Thus, it is not adequate to determine that the crash has occurred only by the communication disruption determination.

Accordingly, the motor control unit of JP 2014-124045 A determines that the vehicle has crashed in the cases where it is determined that there is the possibility of the crash by the crash possibility determination and where it is determined that the communication is disrupted by the communication disruption determination. A situation, in which the communication is disrupted in a state where there is the possibility of the crash of the vehicle, means that a possibility that the vehicle has crashed is high. By combining the crash possibility determination and the communication disruption determination, it becomes possible to accurately grasp the crash of the vehicle. Note that, in this hybrid vehicle, the motor control unit can detect the crash even when the communication between the main control unit and the motor control unit is disrupted by the crash. Thus, even when the above communication is disrupted during the crash, the electric charge can be discharged from the smoothing capacitor.

In the hybrid vehicle of JP 2014-124045 A, the following processing is executed prior to electric discharge of the smoothing capacitor. First, prior to the crash, it is determined that there is the possibility of the crash of the vehicle by the crash possibility determination. In addition, in parallel with the crash possibility determination or after the crash possibility determination, the communication disruption determination is made. A certain time is required for the communication disruption determination because the communication disruption determination is made by monitoring the periodical signals for plural intervals. In the case where the vehicle crashes during or before the communication disruption determination, the periodical signal is no longer transmitted to the motor control unit. The communication disruption determination is finished after the crash, and it is then determined that the communication is disrupted. At this stage, the electric charge is discharged from the smoothing capacitor. The electric charge is discharged from the smoothing capacitor at such timing that is delayed by the time required for the communication disruption determination from the crash. In order to further improve the safety, a technique for advancing electric discharge timing of the smoothing capacitor is necessary.

SUMMARY

This specification provides a technique for shortening a time from a crash to electric discharge of a smoothing capacitor. Needless to say, a possibility that electric charge is thereby discharged from the smoothing capacitor during a non-crash should not be increased. This specification provides the technique for shortening the time from the crash to the electric discharge while suppressing a possibility that the non-crash is erroneously determined as the crash.

In order to secure reliability of the communication disruption determination, a relatively long time has conventionally been spent for the communication disruption determination. However, the inventors have found that, in the case where the communication disruption determination is used in combination with the crash possibility determination, the possibility that the non-crash is erroneously determined as the crash is not increased even when the time spent for the communication disruption determination is shortened. Based on this finding, an electric vehicle disclosed in this specification has been developed. This electric vehicle has the following configuration.

An electric vehicle disclosed in this specification has: a direct current power supply, an inverter, a traveling motor, a smoothing capacitor, a discharge circuit, a motor control unit, a main control unit, a sensor group, and a crash possibility determination unit. The inverter converts a direct current voltage of the direct current power supply to an alternative current voltage. The traveling motor is rotated by the alternative current voltage and rotates drive wheels. The smoothing capacitor is connected between input terminals of the inverter. The discharge circuit can discharge electric charge of the smoothing capacitor. The motor control unit controls the inverter and the discharge circuit. The main control unit periodically transmits a periodical signal to the motor control unit. The sensor group measures a travel state. The crash possibility determination unit determines a possibility of a crash based on data output by the sensor group, and transmits a crash possibility signal to the motor control unit when there is the possibility of the crash. The motor control unit is configured to repeatedly execute a communication disruption determination for determining whether communication between the main control unit and the motor control unit is disrupted. The communication disruption determination is executed based on a periodical signal that the main control unit periodically transmits to the motor control unit. The motor control unit is configured to output a communication disruption signal when the motor control unit determines that the communication is disrupted. The motor control unit is configured to change a determination procedure of the communication disruption determination such that the communication disruption determination is completed in a shorter time when a crash possibility signal is received prior to the communication disruption determination, than when the crash possibility signal is not received prior to the communication disruption determination, the crash possibility signal being transmitted to the motor control unit by the crash possibility determination unit when there is possibility of the crash. And the motor control unit is configured to control the discharge circuit to discharge the electric charge of the smoothing capacitor, when the crash possibility signal is received prior to the communication disruption determination and the communication disruption signal is output.

According to the above configuration, a time from the crash to electric discharge can be shortened while a possibility that a non-crash is erroneously determined as the crash is suppressed.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a flowchart of crash detection processing that is executed by an MG-ECU 90.

DETAILED DESCRIPTION OF EMBODIMENTS

Figure 1:
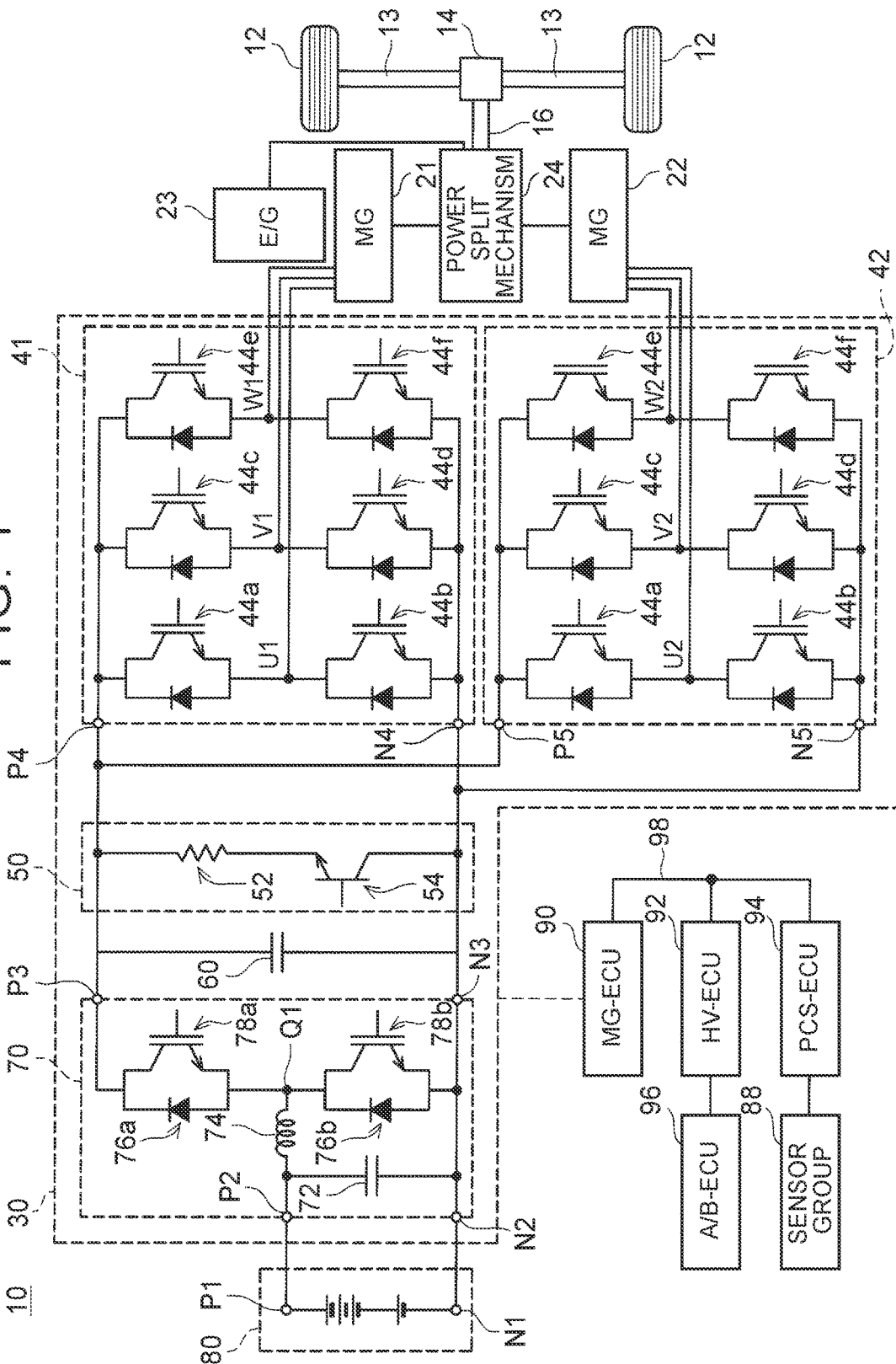
FIG. 1 is a configuration diagram of a hybrid vehicle 10.

A hybrid vehicle 10 of Example 1 that is shown in FIG. 1 travels by rotating two drive wheels 12 by motor generators 21, 22 (hereinafter referred to as MGs) and an engine 23. Note that the MGs 21, 22 function as motors that are supplied with electric power from a battery 80 and drive the drive wheels 12 during acceleration of the hybrid vehicle 10, and the like. In addition, the MGs 21, 22 function as generators that generate the electric power through rotation of the drive wheels 12 and supply the electric power to the battery 80 during deceleration of the hybrid vehicle 10, and the like. The MGs 21, 22 and the engine 23 are connected to the drive wheels 12 via a power split mechanism 24, a propeller shaft 16, a differential gear 14, and an axle 13. The power split mechanism 24 transmits power of the MG 21, the MG 22, and the engine 23 to the propeller shaft 16. The power split mechanism 24 can prevent power transmission between the engine 23 and the propeller shaft 16 by using a built-in clutch. When the propeller shaft 16 is rotated by the power of the MG 21, the MG 22, and the engine 23, rotation thereof is transmitted to the axle 13 via the differential gear 14 and causes rotation of the axle 13 and the drive wheels 12.

The hybrid vehicle 10 has: the battery 80; and a power control circuit 30 that converts the electric power supplied from the battery 80 and supplies the converted electric power to the MGs 21, 22. The power control circuit 30 has a DC-DC converter 70, a smoothing capacitor 60, a discharge circuit 50, a first inverter 41, and a second inverter 42.

The battery 80 has a positive electrode terminal P1 and a negative electrode terminal N1. The battery 80 applies a DC voltage between the positive electrode terminal P1 and the negative electrode terminal N1.

The DC-DC converter 70 has a high-potential input terminal P2, a low-potential input terminal N2, a high-potential output terminal P3, and a low-potential output terminal N3. The high-potential input terminal P2 is connected to the positive electrode terminal P1 of the battery 80. The low-potential input terminal N2 is connected to the negative electrode terminal N1 of the battery 80. The DC-DC converter 70 executes a boosting operation and a voltage lowering operation. In the boosting operation, the DC-DC converter 70 increases the voltage that the battery 80 applies between the input terminals P2, N2 and outputs the increased voltage between the output terminals P3, N3. The boosting operation is executed in the case where the electric power is spent by the MGs 21, 22. In the voltage lowering operation, the DC-DC converter 70 lowers the voltage between the output terminals P3, N3 and outputs the lowered voltage between the input terminals P2, N2. In this way, the battery 80 is charged. The voltage lowering operation is executed in the case where the MGs 21, 22 operate as the generators.

The DC-DC converter 70 has a capacitor 72, a reactor 74, a switching element 78a, a diode 76a, a switching element 78b, and a diode 76b. The capacitor 72 is connected between the input terminals P2, N2. The capacitor 72 smoothes the voltage between the input terminals P2, N2 and suppresses pulsations of this voltage. The low-potential input terminal N2 and the low-potential output terminal N3 are directly connected. One end of the reactor 74 is connected to the high-potential input terminal P2. The switching element 78a and the diode 76a are connected in parallel between the other end Q1 of the reactor 74 and the high-potential output terminal P3. The diode 76a is connected in such a direction that a cathode faces the high-potential output terminal P3 side. The switching element 78b and the diode 76b are connected in parallel between the other end Q1 of the reactor 74 and the low-potential output terminal N3 (that is, the low-potential input terminal N2). The diode 76b is connected in such a direction that an anode faces the low-potential output terminal N3 side. The DC-DC converter 70 executes the boosting operation and the voltage lowering operation when the switching element 78a and the switching element 78b are switched.

The first inverter 41 has a high-potential input terminal P4, a low-potential input terminal N4, and three output wires U1, V1, W1. The high-potential input terminal P4 is connected to the high-potential output terminal P3 of the DC-DC converter 70. The low-potential input terminal N4 is connected to the low-potential output terminal N3 of the DC-DC converter 70. The three output wires U1, V1, W1 are connected to the MG 21. A DC voltage between the output terminals P3, N3 of the DC-DC converter 70 (a higher DC voltage than the DC voltage of the battery 80) is applied between the input terminals P4, N4 of the first inverter 41. The first inverter 41 converts the DC voltage between the input terminals P4, N4 to a three-phase AC voltage and outputs the converted three-phase AC voltage to the output wires U1, V1, W1. The MG 21 is supplied with the three-phase AC voltage from the first inverter 41, is rotated, and thereby rotates the drive wheels 12.

The first inverter 41 has reverse conduction type switching devices 44a to 44f. Each of the reverse conduction type switching devices 44 is constructed with a parallel circuit of a switching element and a diode. Each of the diodes is connected in such a direction that a cathode faces a high-potential side (the high-potential input terminal P4 side). A series circuit of the reverse conduction type switching devices 44a, 44b, a series circuit of the reverse conduction type switching devices 44c, 44d, and a series circuit of the reverse conduction type switching devices 44e, 44f are connected in parallel between the high-potential input terminal P4 and the low-potential input terminal N4. The output wire U1 is connected between the reverse conduction type switching devices 44a, 44b, the output wire V1 is connected between the reverse conduction type switching devices 44c, 44d, and the output wire W1 is connected between the reverse conduction type switching devices 44e, 44f. The first inverter 41 operates when each of the reverse conduction type switching devices 44 is switched.

The second inverter 42 has a high-potential input terminal P5, a low-potential input terminal N5, and three output wires U2, V2, W2. The high-potential input terminal P5 is connected to the high-potential output terminal P3 of the DC-DC converter 70. The low-potential input terminal N5 is connected to the low-potential output terminal N3 of the DC-DC converter 70. The three output wires U2, V2, W2 are connected to the MG 22. An internal structure of the second inverter 42 is equal to an internal structure of the first inverter 41. The DC voltage between the output terminals P3, N3 of the DC-DC converter 70 is applied between the input terminals P5, N5 of the second inverter 42. The second inverter 42 converts the DC voltage between the input terminals P5, N5 to a three-phase AC voltage and outputs the converted three-phase AC voltage to the output wires U2, V2, W2. The MG 22 is supplied with the three-phase AC voltage from the second inverter 42, is rotated, and thereby rotates the drive wheels 12.

The smoothing capacitor 60 is connected between the input terminals P4, N4 of the first inverter 41. It can be said that the smoothing capacitor 60 is connected between the input terminals P5, N5 of the second inverter 42. It can also be said that the smoothing capacitor 60 is connected between the output terminals P3, N3 of the DC-DC converter 70. The smoothing capacitor 60 smoothes the voltage between the input terminals P4, N4 of the first inverter 41 (that is, between the input terminals P5, N5 of the second inverter 42) and suppresses pulsations of this voltage. In a normal time, a high voltage is applied to the smoothing capacitor 60. Thus, electric charge is accumulated in the smoothing capacitor 60.

The discharge circuit 50 is connected in parallel with the smoothing capacitor 60 between the input terminals P4, N4 of the first inverter 41. The discharge circuit 50 is a series circuit of a resistor 52 and a switching element 54. The switching element 54 remains off in the normal time. As will be described in detail below, when the crash of the vehicle is detected, the switching element 54 is turned on, and the electric charge of the smoothing capacitor 60 is discharged via the discharge circuit 50.

The hybrid vehicle 10 has plural electronic control units (hereinafter referred to as ECUs). As shown in FIG. 1, the hybrid vehicle 10 has a motor generator-ECU (an MG-ECU) 90, a hybrid vehicle-ECU (an HV-ECU) 92, a pre-crash safety-ECU (a PCS-ECU) 94, and an airbag-ECU (an A/B-ECU) 96. Two each of the MG-ECU 90, the HV-ECU 92, and the PCS-ECU 94 are connected by a controller area network (CAN) 98. The A/B-ECU 96 is connected to the HV-ECU 92.

The HV-ECU 92 is an ECU for controlling the entire hybrid vehicle 10. The HV-ECU 92 is connected to a sensor that detects an accelerator operation amount of the hybrid vehicle 10. On the basis of a detection value of the accelerator operation amount sensor, the HV-ECU 92 determines the output of the engine 23 and the output of the MGs 21, 22. The HV-ECU 92 controls the engine 23 in accordance with the determined output of the engine 23. In addition, the HV-ECU 92 transmits data for instructing the output of the MGs 21, 22 (hereinafter output instruction data) to the MG-ECU 90. The HV-ECU 92 repeatedly executes the above-described processing for determining the output of the engine 23 and the output of the MGs 21, 22 at constant intervals. Accordingly, the output instruction data is periodically transmitted from the HV-ECU 92 to the MG-ECU 90. Furthermore, the HV-ECU 92 periodically transmits other types of data to the MG-ECU 90. For example, the HV-ECU 92 periodically transmits ignition data that indicates whether an ignition is on to the MG-ECU 90. In addition to the output instruction data and the ignition data, various types of the data are periodically transmitted from the HV-ECU 92 to the MG-ECU 90. A transmission interval of the data differs by data type. For example, in order to accurately control the MGs 21, 22, the output instruction data is transmitted at shorter intervals than those of the ignition data. Because the HV-ECU 92 is the ECU that controls the entire hybrid vehicle 10, the HV-ECU 92 is mounted at a position away from the power control circuit 30.

The MG-ECU 90 is connected to the power control circuit 30. The MG-ECU 90 receives the output instruction data that is transmitted by the HV-ECU 92, and, based on the received output instruction data, controls switching of the switching elements 78a, 78b of the DC-DC converter 70, switching of the reverse conduction type switching devices 44a to 44f of the first inverter 41, and switching of the reverse conduction type switching devices 44a to 44f of the second inverter 42. In this way, the MG-ECU 90 rotates the MGs 21, 22 by the output that corresponds to the output instruction data. In addition, the MG-ECU 90 controls switching of the switching element 54 of the discharge circuit 50. Control of the switching element 54 will be described in detail below. Furthermore, the MG-ECU 90 controls on/off of a power supply of the power control circuit 30 in accordance with the ignition data that is transmitted from the HV-ECU 92. Just as described, the MG-ECU 90 is an ECU that is dedicated to control of the power control circuit 30. Thus, the MG-ECU 90 is mounted in the vicinity of the power control circuit 30 (for example, in the same case). Accordingly, the MG-ECU 90 is mounted at a position away from the HV-ECU 92, and the wire therebetween (the CAN 98) is long.

The PCS-ECU 94 is connected to a sensor group 88. The sensor group 88 has a large number of sensors that detect a travel situation of the hybrid vehicle 10. For example, the sensor group 88 contains: a millimeter wave radar and/or a camera that detects obstacles and other vehicles around the vehicle; an acceleration sensor that detects acceleration added to the vehicle; a vehicle speed sensor that detects a travel speed of the vehicle; an angular sensor that detects a steering angle of a steering wheel; and the like. The PCS-ECU 94 determines whether there is a possibility of the crash of the vehicle based on data received from the sensor group 88. If there is the possibility of the crash, the PCS-ECU 94 transmits a crash possibility signal to the MG-ECU 90. In addition, if it is determined that there is the possibility of the crash, the PCS-ECU 94 determines whether the possibility of the crash is high or low. If the possibility of the crash is relatively low, the PCS-ECU 94 transmits a first crash possibility signal. If the possibility of the crash is high, the PCS-ECU 94 transmits a second crash possibility signal. Accordingly, there are cases where the first crash possibility signal is transmitted and where the second crash possibility signal is transmitted as the crash possibility signal. The crash possibility signal is transmitted prior to timing at which the vehicle actually crashes. Hereinafter, the above-described determination by the PCS-ECU 94 may be referred to as a crash possibility determination.

The A/B-ECU 96 is connected to an acceleration sensor, which is not shown. This acceleration sensor may be the acceleration sensor that is contained in the above-described sensor group 88. The A/B-ECU 96 determines whether the vehicle has crashed based on data received from the acceleration sensor. If it is determined that the vehicle has crashed, the A/B-ECU 96 transmits a crash signal to the HV-ECU 92. The crash signal is transmitted by the A/B-ECU 96 immediately after the crash of the vehicle. When receiving the crash signal, the HV-ECU 92 actuates airbags, which are not shown.

Next, a description will be made on an operation of the MG-ECU 90 for discharging the electric charge of the smoothing capacitor 60. The MG-ECU 90 repeatedly executes processing shown in FIG. 2 during traveling of the vehicle.

In step S10, the MG-ECU 90 determines whether the crash possibility signal is received. Here, it is determined whether the crash possibility signal was received in a few seconds before timing at which step S10 is executed. If the PCS-ECU 94 does not transmit the crash possibility signal (that is, if it is determined in the last crash possibility determination that there is no possibility of the crash of the vehicle), it is determined NO in step S10. In this case, the MG-ECU 90 makes a normal communication disruption determination in step S12.

In the normal communication disruption determination in step S12, the MG-ECU 90 monitors the data that is periodically transmitted from the HV-ECU 92 to the MG-ECU 90, and determines whether the communication between the HV-ECU 92 and the MG-ECU 90 is disrupted. Note that, as described above, many types of the data are periodically transmitted from the HV-ECU 92 to the MG-ECU 90, and the transmission intervals of these differ by data type. First, among the many types of the data that are periodically transmitted from the HV-ECU 92 to the MG-ECU 90, three types of the data (first data, second data, and third data) that are used for the communication disruption determination will be described. The first data is the data that is transmitted at intervals of 100 msec. The second data is the data that is transmitted at intervals of 300 msec. The third data is the data that is transmitted at intervals of 700 msec. The first data, the second data, and the third data can be any type of data as long as differences among them can be determined. For example, any one of the first data, the second data, and the third data may be the above-described output instruction data or ignition data.

In the normal communication disruption determination in step S12, the MG-ECU 90 sets a duration t of a monitoring period to 3.5 seconds and determines whether the third data can appropriately be received in the monitoring period. 3.5 seconds is five times longer than the interval of the third data (700 msec). Thus, if the communication is in a good condition, the third data can be received five times in the monitoring period. Here, the MG-ECU 90 determines whether the communication is disrupted based on whether the third data can be received five times in the monitoring period. However, data transmission/reception error possibly occurs. Thus, it may be determined whether the communication is disrupted based on whether the third data can be received the specified number of times that is smaller than five (for example, four times) in the monitoring period. If the third data can appropriately be received in step S12, the MG-ECU 90 determines that the communication is not disrupted, and thus determines NO in step S14. In this case, a series of the processing is terminated. The MG-ECU 90 executes the processing shown in FIG. 2 from the beginning again. On the other hand, if the third data cannot appropriately be received in step S12, the MG-ECU 90 determines that the communication is disrupted, and thus determines YES in step S14. In this case, the MG-ECU 90 executes an abnormality operation in step S16.

In step S16, the MG-ECU 90 outputs a communication disruption signal meaning that the communication is disrupted. The communication disruption signal is a unique signal that is output at a time when the communication is disrupted. The communication disruption signal may be a signal that is output from the MG-ECU 90 to the CAN 98, may be a signal that is transmitted from the MG-ECU 90 to the power control circuit 30, or may be another signal. Output of the communication disruption signal means failure of the HV-ECU 92 or disconnection of a communication line between the HV-ECU 92 and the MG-ECU 90. When the communication is disrupted, the MG-ECU 90 can no longer receive the output instruction data from the HV-ECU 92. Thus, it becomes difficult to appropriately control the MGs 21, 22. Accordingly, each communicable section of the hybrid vehicle 10 is operated based on the communication disruption signal and executes the abnormality operation. As the abnormality operations, for example, lighting of a warning lamp on a front panel, stopping of the engine 23, and the like are raised. In addition, the MG-ECU 90 may rotate the MGs 21, 22 at a low speed. The transmission of the output instruction data is disrupted due to the communication disruption. Thus, the MG-ECU 90 can no longer control the MGs 21, 22 in accordance with the accelerator operation amount. However, the MG-ECU 90 can still rotate the MGs 21, 22. When the MG-ECU 90 rotates the MGs 21, 22 at the low speed, the vehicle travels at a low speed as in an idle time. In this way, the vehicle can move to a road shoulder or the like.

However, the determination of YES in step S14 does not mean the crash of the vehicle. Thus, in step S16, the MG-ECU 90 keeps the switching element 54 of the discharge circuit 50 in an off state and does not discharge the electric charge of the smoothing capacitor 60.

On the other hand, if it is determined YES in step S10 (that is, if it is determined in the last crash possibility determination that there is the possibility of the crash of the vehicle), the MG-ECU 90 executes step S18. In step S18, the MG-ECU 90 determines whether the received crash possibility signal is the first crash possibility signal or the second crash possibility signal. As described above, the second crash possibility signal is the signal meaning that the possibility of the crash is higher than the first crash possibility signal. If the first crash possibility signal is received, the MG-ECU 90 executes step S20.

In step S20, the MG-ECU 90 makes a first emergency communication disruption determination. In the first emergency communication disruption determination, the MG-ECU 90 sets the duration t of the monitoring period to 1.5 seconds and determines whether the second data can appropriately be received in the monitoring period. 1.5 seconds is five times longer than the interval of the second data (300 msec). Thus, if the communication is in good condition, the second data can be received five times in the monitoring period. The MG-ECU 90 determines whether the communication is disrupted based on whether the second data can be received five times (or the specified number of times that is smaller than that (for example, four times)) in the monitoring period. If the second data can appropriately be received in step S20, the MG-ECU 90 determines that the communication is not disrupted, and determines NO in step S24. In this case, a series of the processing is terminated. The MG-ECU 90 executes the processing shown in FIG. 2 from the beginning again. On the other hand, if the second data cannot appropriately be received in step S20, the MG-ECU 90 determines that the communication is disrupted, and determines YES in step S24. In this case, the MG-ECU 90 executes step S26.

Step S26 is executed if it is determined in the crash possibility determination that there is the possibility of the crash and if it is determined in the communication disruption determination that the communication is disrupted. In the case where the two determinations are made just as described, it can be determined that the vehicle has crashed. Accordingly, in step S26, the MG-ECU 90 transmits a signal to a gate of the switching element 54 of the discharge circuit 50 and turns on the switching element 54. Then, both ends of the smoothing capacitor 60 are connected via the resistor 52 and the switching element 54. Accordingly, the electric charge that is accumulated in the smoothing capacitor 60 flows via the resistor 52 and the switching element 54. In this way, the electric charge is discharged from the smoothing capacitor 60. Because resistance of the resistor 52 is low, the electric charge is rapidly discharged from the smoothing capacitor 60. Just as described, in the case where the vehicle has crashed, the electric charge is promptly discharged from the smoothing capacitor 60, and safety of the vehicle is secured. Note that the signal that is transmitted from the MG-ECU 90 to the gate of the switching element 54 is one type of the communication disruption signal. In addition, in step S26, the MG-ECU 90 may output the communication disruption signal to the CAN 98 and the like so that each of the communicable sections of the hybrid vehicle 10 may execute stopping of the engine 23 and the like.

On the other hand, if it is determined in step S18 that the second crash possibility signal is received, the MG-ECU 90 executes step S22. In step S22, the MG-ECU 90 makes a second emergency communication disruption determination. In the second emergency communication disruption determination, the MG-ECU 90 sets the duration t of the monitoring period to 0.5 second and determines whether the first data can appropriately be received in the monitoring period. 0.5 second is five times longer than the interval of the first data (100 msec). Thus, if the communication is in good condition, the first data can be received five times in the monitoring period. The MG-ECU 90 determines whether the communication is disrupted based on whether the first data can be received five times (or the specified number of times that is smaller than that (for example, four times)) in the monitoring period. If the first data can appropriately be received in step S22, the MG-ECU 90 determines that the communication is not disrupted, and determines NO in step S24. In this case, a series of the processing is terminated. The MG-ECU 90 executes the processing shown in FIG. 2 from the beginning again. On the other hand, if the first data cannot appropriately be received in step S22, the MG-ECU 90 determines that the communication is disrupted, and determines YES in step S24. In this case, the MG-ECU 90 executes step S26. Also, in this case, the electric charge is discharged from the smoothing capacitor 60 in step S26, and the safety of the vehicle during the crash is secured.

As it has been described so far, in the hybrid vehicle 10 of Example 1, the crash of the vehicle is determined by the crash possibility determination and the communication disruption determination. In this way, the crash can accurately be detected, and the electric charge can be discharged from the smoothing capacitor 60. In addition, there is a case where the communication between the PCS-ECU 94 and the MG-ECU 90 is disrupted during the crash. However, the crash possibility signal is transmitted from the PCS-ECU 94 to the MG-ECU 90 prior to the crash. Thus, this communication disruption does not impact on the processing in FIG. 2. Furthermore, even in the case where the communication between the HV-ECU 92 and the MG-ECU 90 is disrupted due to the crash, the MG-ECU 90 can appropriately execute the processing in FIG. 2. Moreover, the MG-ECU 90 and the power control circuit 30 are arranged in adjacent to each other. Accordingly, even when the vehicle crashes, the communication therebetween is less likely to be disrupted. Thus, according to the processing in FIG. 2, reliability of discharge processing of the smoothing capacitor 60 during the crash can be improved.

In the hybrid vehicle 10 of Example 1, in the communication disruption determination in the case where the crash possibility signal is received in advance (that is, steps S20, S22), the communication disruption determination is made in a shorter time period than in the communication disruption determination in the case where the crash possibility signal is not received in advance (that is, step S12). In the case where it is determined in advance that there is the possibility of the crash, it is in a situation where the possibility that the communication disruption due to the crash occurs is high. Thus, even when a time for the communication disruption determination is shortened, a risk of an erroneous determination is low. Just as described, by shortening the time spent for the communication disruption determination, a time from the crash to the electric discharge of the smoothing capacitor 60 can be shortened. That is, the electric charge can be discharged from the smoothing capacitor 60 after a short time from the crash while the risk of the erroneous determination is suppressed to be minimal. In addition, in the communication disruption determination in the case where the crash possibility signal is not received in advance (that is, step S12), the time for the communication disruption determination is extended to secure the reliability of the communication disruption determination. Just as described, according to this hybrid vehicle 10, the reliability of the communication disruption determination can be secured, and the electric charge can be discharged from the smoothing capacitor 60 after the short time from the crash. Therefore, the safety during the crash can be improved.

In the hybrid vehicle 10 of Example 1, the crash possibility signal has the first crash possibility signal and the second crash possibility signal at the different levels. Then, in the case where the second crash possibility signal with the high possibility of the crash is received, the time spent for the communication disruption determination is shortened in comparison with the case where the first crash possibility signal is received. In the case where the possibility of the crash is high, the possibility of occurrence of the communication disruption due to the crash is also high. Accordingly, even in the case where the time spent for the communication disruption determination is shortened, the reliability of the communication disruption determination is not degraded significantly. In addition, according to this configuration, in the case where the possibility of the crash is high, the electric charge can be discharged from the smoothing capacitor 60 at further early timing.

In the hybrid vehicle 10 of Example 1, in the communication disruption determination in the case where the crash possibility signal is received in advance (that is, steps S20, S22), the communication disruption determination is made based on the data with the shorter transmission interval than in the communication disruption determination in the case where the crash possibility signal is not received in advance (that is, step S12).

Accordingly, even in the case where the crash possibility signal is received in advance (that is, in the case where the time spent for the communication disruption determination is short), the number of the data treated as determination targets is increased. Thus, the reliability of the communication disruption determination can be secured.

In a hybrid vehicle of Example 2, processing in steps S20, S22 in FIG. 2 differs from that in Example 1. Other configurations of the hybrid vehicle of Example 2 are equal to those of Example 1. In the hybrid vehicle of Example 2, the communication disruption determination in steps S20, S22 is made by using the third data (the data with the interval of 700 msec) as in step S12.

In step S20, the MG-ECU 90 sets the duration t of the monitoring period to 2.8 seconds that is shorter than that in step S12 (t=3.5 seconds). 2.8 seconds is four times longer than the interval of the third data (700 msec). Thus, if the communication is in good condition, the third data can be received four times in the monitoring period. That is, in step S20, the number of the third data that is used for the communication disruption determination is four and is smaller than that in step S12. In step S20, the MG-ECU 90 determines whether the communication is disrupted based on whether the third data can be received four times (or the specified number of times that is smaller than that (for example, three times)) in the monitoring period.

In step S22, the MG-ECU 90 sets the duration t of the monitoring period to 2.1 seconds that is even shorter than the duration t in step S20. 2.1 seconds is three times longer than the interval of the third data. Thus, if the communication is in good condition, the third data can be received three times in the monitoring period. That is, in step S22, the number of the third data that is used for the communication disruption determination is three and is even smaller than the number in step S20. In step S22, the MG-ECU 90 determines whether the communication is disrupted based on whether the third data can be received three times (or the specified number of times that is smaller than that (for example, twice)) in the monitoring period.

Just as described, by reducing the number of data that is used for the communication disruption determination, the time for the communication disruption determination can also be shortened. Similar to Example 1, also in Example 2, the electric charge can promptly be discharged from the smoothing capacitor 60 during the crash while the reliability of the communication disruption determination is maintained.

Note that the hybrid vehicles of Examples 1, 2 each have the A/B-ECU 96. However, when the A/B-ECU 96 detects the crash, the electric charge may be discharged from the smoothing capacitor 60. Just as described, also in the case where the crash of the vehicle is detected in processing other than the processing shown in FIG. 2, the electric charge may be discharged from the smoothing capacitor 60.

In the hybrid vehicles of Examples 1, 2, in addition to the smoothing capacitor 60, electric charge of the capacitor 72 may be discharged in step S26.

The hybrid vehicles of Examples 1, 2 each have the DC-DC converter 70. However, the hybrid vehicles in Examples 1, 2 may be configured that the DC-DC converter 70 is not provided and that the voltage of the battery 80 is directly applied between the input terminals of the first inverter 41 and the second inverter 42. In addition, another DC power supply, such as a fuel cell, may be used instead of the battery 80.

In the hybrid vehicles of Examples 1, 2, the PCS-ECU 94 directly transmits the crash possibility signal to the MG-ECU 90. However, the PCS-ECU 94 may transmit the crash possibility signal to the HV-ECU 92, and the HV-ECU 92 may transmit the crash possibility signal to the MG-ECU 90.

The configurations of Examples 1, 2 may be combined. In the case where the possibility of the crash is high, the communication disruption determination may be made based on the data with the short intervals, and the number of the data that is used for the communication disruption determination may be reduced.

The circuit that is constructed with the battery 80 and the DC-DC converter 70 in Examples 1, 2 is one example of the DC power supply. The MG-ECU 90 in Examples 1, 2 is one example of the motor control unit. The HV-ECU 92 in Examples 1, 2 is one example of the main control unit. The PCS-ECU 94 in Examples 1, 2 is one example of the crash possibility determination unit. Each of the first data, the second data, and the third data in Examples 1, 2 is one example of the periodical signal. Step S10 in Examples 1, 2 is one example of "changing a determination procedure of the communication disruption determination such that the communication disruption determination is completed in a shorter time when a crash possibility signal is received prior to the communication disruption determination, than when the crash possibility signal is not received prior to the communication disruption determination". Step S26 in Examples 1, 2 is one example of "discharging the electric charge of the smoothing capacitor". Step S18 in Examples 1, 2 is one example of "changing the determination procedure such that the communication disruption determination is completed in a shorter time when the second crash possibility signal is received prior to the communication disruption determination, than when the first crash possibility signal is received prior to the execution of the communication disruption determination". The third data in Examples 1, 2 is one example of the second periodical signal. Each of the first data and the second data in Examples 1, 2 is one example of the first periodical signal.

Note that the configurations, which will be listed below, demonstrate utility when used independently.

In one example of the electric vehicle that is disclosed in this specification, the crash possibility determination unit transmits the first crash possibility signal and the second crash possibility signal indicating that the possibility of the crash is higher than the first crash possibility signal. In this case, in the case where the second crash possibility signal is received prior to the communication disruption determination, the motor control unit executes the processing for changing to the determination procedure, in which the communication disruption determination is completed in the even shorter time than in the case where the first crash possibility signal is received prior to the communication disruption determination.

As described above, the possibility of the crash is provided with the levels, and the time spent for the communication disruption determination is shortened as the possibility of the crash is increased. In this way, the electric charge can be discharged from the capacitor in the even shorter time in the case where the possibility of the crash is high.

In the one example of the electric vehicle that is disclosed in this specification, the periodical signal includes the first periodical signal and the second periodical signal whose interval is longer than that of the first periodical signal. In this case, in the case where the crash possibility signal is received prior to the communication disruption determination, the motor control unit makes the communication disruption determination based on the first periodical signal. In the case where the crash possibility signal is not received prior to the communication disruption determination, the motor control unit makes the communication disruption determination based on the second periodical signal.

In this configuration, in the case where the communication disruption determination is made in the short time (in the case where the crash possibility signal is received prior to the communication disruption determination), the communication disruption determination is made based on the first periodical signal with the short intervals. In this way, even in the short time, the number of the periodical signals that are used for the determination can be increased. Therefore, the reliability of the communication disruption determination can be secured.

Note that the periodical signal may have two or more types of the periodical signals whose intervals differ (for example, first to third periodical signals). In this case, in the case where the crash possibility signal is received, the communication disruption determination may be made based on the periodical signal with shorter intervals as the possibility of the crash is increased.

In the one example of the electric vehicle that is disclosed in this specification, in the case where the crash possibility signal is received prior to the communication disruption determination, the motor control unit executes the processing for reducing the number of the periodical signals that are used for the communication disruption determination to be smaller than that in the case where the crash possibility signal is not received prior to the communication disruption determination.

According to this configuration, in the case where the crash possibility signal is received prior to the communication disruption determination, the time spent for the communication disruption determination can be shortened.

Note that the DC power supply disclosed in this specification may be a battery, a combination of the battery and a boosting converter that increases a battery voltage, or a fuel cell. In addition, any of various types of signals can be adopted as the periodical signal, for example, like a signal for instructing an output value of the traveling motor, or the like.

In the electric vehicle that is disclosed in this specification, in the case where the crash possibility signal is received prior to the communication disruption determination (that is, if it is determined that there is the possibility of the crash), the motor control unit makes the communication disruption determination in the shorter time than in the case where the crash possibility signal is not received prior to the communication disruption determination. The determination that there is the possibility of the crash means that a possibility that the communication disruption due to the crash occurs thereafter is high. Accordingly, if it is determined in advance that there is the possibility of the crash (that is, in the case where it is indicated as the situation where the possibility that the communication disruption due to the crash occurs is high), the risk of the erroneous determination in the communication disruption determination is low even when the time for the communication disruption determination is shortened. In addition, by shortening the time spent for the communication disruption determination, the time from the crash to the electric discharge of the smoothing capacitor can be shortened. That is, the electric charge can be discharged from the smoothing capacitor after the short time from the crash while the risk that the non-crash is erroneously determined as the crash is suppressed to be minimal. Furthermore, in the case where the crash possibility signal is not received prior to the communication disruption determination, the motor control unit extends the time for the communication disruption determination, so as to secure the reliability of the communication disruption determination. Just as described, according to this electric vehicle, the reliability of the communication disruption determination can be secured in any case, and the electric charge can be discharged from the smoothing capacitor after the short time from the crash. Therefore, the safety during the crash can be improved.

Note that the electric vehicle may be configured that the electric charge may be discharged from the smoothing capacitor not only in the above-described case (that is, in the cases where the crash possibility signal is received prior to the communication disruption determination and where the communication disruption signal is output) but also in a case that is different from the above-described case.

The detailed description has been made so far on the specific examples of the electric vehicle disclosed in this specification. However, these are merely illustrative, and various modifications and changes that are made to the above-illustrated specific examples are included herein. Technical elements that are described in this specification and the drawings demonstrate technical utility when used singly or in various combinations.

The invention claimed is:

1. An electric vehicle comprising:
   a direct current power supply;
   an inverter configured to convert a direct current voltage of the direct current power supply to an alternative current voltage;
   a motor for traveling of the electric vehicle, the motor being configured to be rotated by the alternative current voltage;
   a smoothing capacitor connected between input terminals of the inverter;
   a discharge circuit configured to discharge electric charge of the smoothing capacitor;
   a sensor group configured to measure a travel state;
   a main control unit;
   a crash possibility determination unit configured to determine a possibility of a crash based on data output by the sensor group; and
   a motor control unit configured to
   i) control the inverter and the discharge circuit,
   ii) repeatedly execute a communication disruption determination for determining whether communication between the main control unit and the motor control unit is disrupted, the communication disruption determination being executed based on a periodical signal that the main control unit periodically transmits to the motor control unit,
   iii) output a communication disruption signal when the motor control unit determines that the communication is disrupted,
   iv) change a determination procedure of the communication disruption determination such that the communication disruption determination is completed in a shorter time when a crash possibility signal is received prior to the communication disruption determination, than when the crash possibility signal is not received prior to the communication disruption determination, the crash possibility signal being transmitted to the motor control unit by the crash possibility determination unit when there is possibility of the crash, and
   v) control the discharge circuit to discharge the electric charge of the smoothing capacitor, when the crash possibility signal is received prior to the communication disruption determination and the communication disruption signal is output.

2. The electric vehicle according to claim 1, wherein
   the crash possibility determination unit is configured to transmit a first crash possibility signal and a second crash possibility signal , a possibility of the crash indicated by the second crash possibility signal being higher than a possibility of the crash indicated by the first crash possibility signal, and
   the motor control unit is configured to change the determination procedure such that the communication disruption determination is completed in a shorter time when the second crash possibility signal is received prior to the communication disruption determination, than when the first crash possibility signal is received prior to the communication disruption determination.

3. The electric vehicle according to claim 1, wherein
   the periodical signal includes a first periodical signal and a second periodical signal, an interval of the second periodical signal being longer than an interval of the first periodical signal,
   the motor control unit is configured to execute the communication disruption determination based on the first periodical signal when the crash possibility signal is received prior to the communication disruption determination, and
   the motor control unit is configured to execute the communication disruption determination based on the second periodical signal when the crash possibility signal is not received prior to the communication disruption determination.

4. The electric vehicle according to claim 1, wherein
   the motor control unit is configured to reduce the number of the periodical signals that are used for the communication disruption determination to be smaller when the crash possibility signal is received prior to the communication disruption determination, than when the crash possibility signal is not received prior to the communication disruption determination.

* * * * *